UNITED STATES PATENT OFFICE.

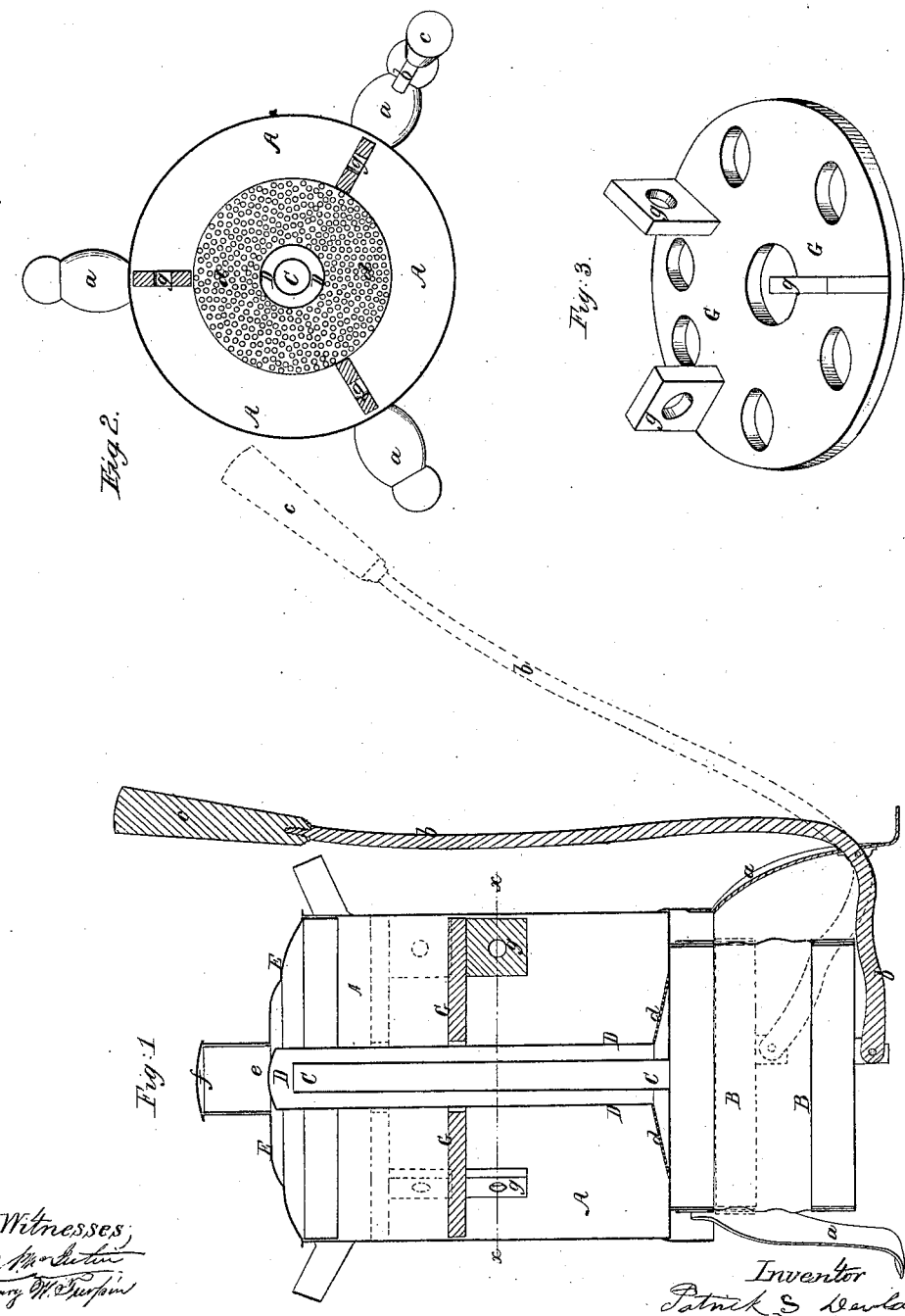
P. S. DEVLEN.
CHURN.
No. 24,382. Patented June 14, 1859.

PATRICK S. DEVLAN, OF READING, PENNSYLVANIA.

CHURN.

Specification of Letters Patent No. 24,382, dated June 14, 1859.

*To all whom it may concern:*

Be it known that I, P. S. DEVLAN, of Reading, county of Berks, in the State of Pennsylvania, have invented new and useful Improvements in Churns; and I do hereby declare that the following is a full and exact description thereof, reference being had to the accompanying drawings and to the letters of reference marked thereon.

Previous to my invention churns have been constructed in such a manner as to have employed in them no dasher, but to form butter by the employment only of a blast of atmospheric air forced into the body of milk or cream in such manner, as to mechanically separate the oily and serous particles of the cream from each other; but in all such atmospheric churns (with which I am acquainted) objections exist in the concentrated application of the current or blast of air, and in the use of valves and other complexities of mechanism, and in the absence of some method of collecting and amassing the coagulations as they form.

The object of my invention is such a construction of atmospheric churn as will form in a short time the greatest quantity of butter from a given quantity of cream, and at the same time be simple and economical; and to this end my invention consists, in introducing into the body of the cream or milk to be churned a blast of air in such manner as to be effectually dissipated throughout the whole mass; and my invention further consists in the arrangement of the (air) feed pipe in such a manner as to form a water joint, and thus render a valve unnecessary as will be hereinafter described; and my invention further consists, in the application and arrangement within the body of the churn, of a float which moves with the body of cream during its ebullition or disturbance (by the blast) and collects the coagulations or particles of butter as they form.

In the accompanying drawings forming part of this specification, Figure 1, represents a vertical section through the center of one of my improved atmospheric churns. Fig. 2, represents a horizontal section at the line $x$, $x$, Fig. 1. Fig. 3, represents a perspective view of the float.

The red lines seen in the drawings are used to illustrate in another position similar parts seen drawn in black, the same letters indicating the same parts of the machine in the different views.

A, is the body of the churn which is represented as being cylindrical and supported by legs $a$, $a$, $a$. Beneath the body of the churn is arranged a bellows B, constructed in the usual manner and operated by a lever $b$, which has its fulcrum in one of the legs $a$, and extends upward alongside of the body of the churn, said lever is furnished at its upper end with a suitable handle $c$, and its direction of motion as also that of the bellows is indicated by the red lines in Fig. 1. From the center of the upper side of the bellows B, extends upward a vertical pipe C, through which the air accumulated by the bellows is forced; this pipe or tube, C, is open at its upper end, but is entirely surrounded to within a short distance of its base by another tube D, of greater diameter which tube D, is connected at its base to the center of the convex perforated disk $d$.

E, is a cover or lid having a hollow teat $e$, at its center projecting upward to accommodate the upper end of the tube D, and furnished with a cover $f$.

G, is the float which consists of a wooden disk perforated, and having projections $g$, as illustrated, the whole so formed as to float on and move up and down with the mass of cream when disturbed, and have many projections and surfaces to collect the particles of butter as they are formed.

The operation of my improved churn is simple and will be readily comprehended from the following brief explanation viz: The body A, of the churn being supplied with a suitable quantity of cream or milk (say one third full) the operator grasping the handle $c$, moves the lever $b$, backward and forward in the direction of motions indicated by the red lines in Fig. 1, thus operating the bellows B, and causing an intermittent stream or blast of air to be forced up through the pipe, C, thence down around the outside of the pipe, C, and inside of the pipe D, (as indicated by the arrows in Fig. 1) and thence through the perforated disk $d$, penetrating the mass of cream thoroughly in every direction and mechanically separating the oily and serous particles of the cream from each other; as the body of cream is agitated by the blast of air the float G, is tossed up and down with it, increasing slightly the agitation and collects and amasses the particles of butter as they are formed. The disk G, may be formed of a plate perforated or of gauze; its most important characteristic being such a capacity of its perforations as to admit readily of the passage of the blast of air and to divide and dissipate it; while at the same time to prevent the ready flow of the cream through it.

It will be seen from the foregoing description, and by reference to the drawings that with my improved construction of atmospheric churn the blast of air is thoroughly dissipated throughout the entire body of cream, while the mechanism employed is simple in its formation; and it will also be seen that the operation of churning by a blast of air is greatly facilitated by the arrangement within the churn of a float such as described which collects the particles of butter.

What I claim as of my invention and desire to secure by Letters Patent is,

The employment, in a churn in which the cream is acted upon by a blast only, of a float G, substantially as and for the purpose hereinbefore described.

In testimony whereof I have hereunto set my hand this third day of May 1859.

PATRICK S. DEVLAN.

Witnesses:
J. McINTIRE,
HENRY W. TURPIN.